Feb. 21, 1928.
J. A. DEVINE
PAPER MAKING MACHINE
Re. 16,883
Original Filed June 15, 1925
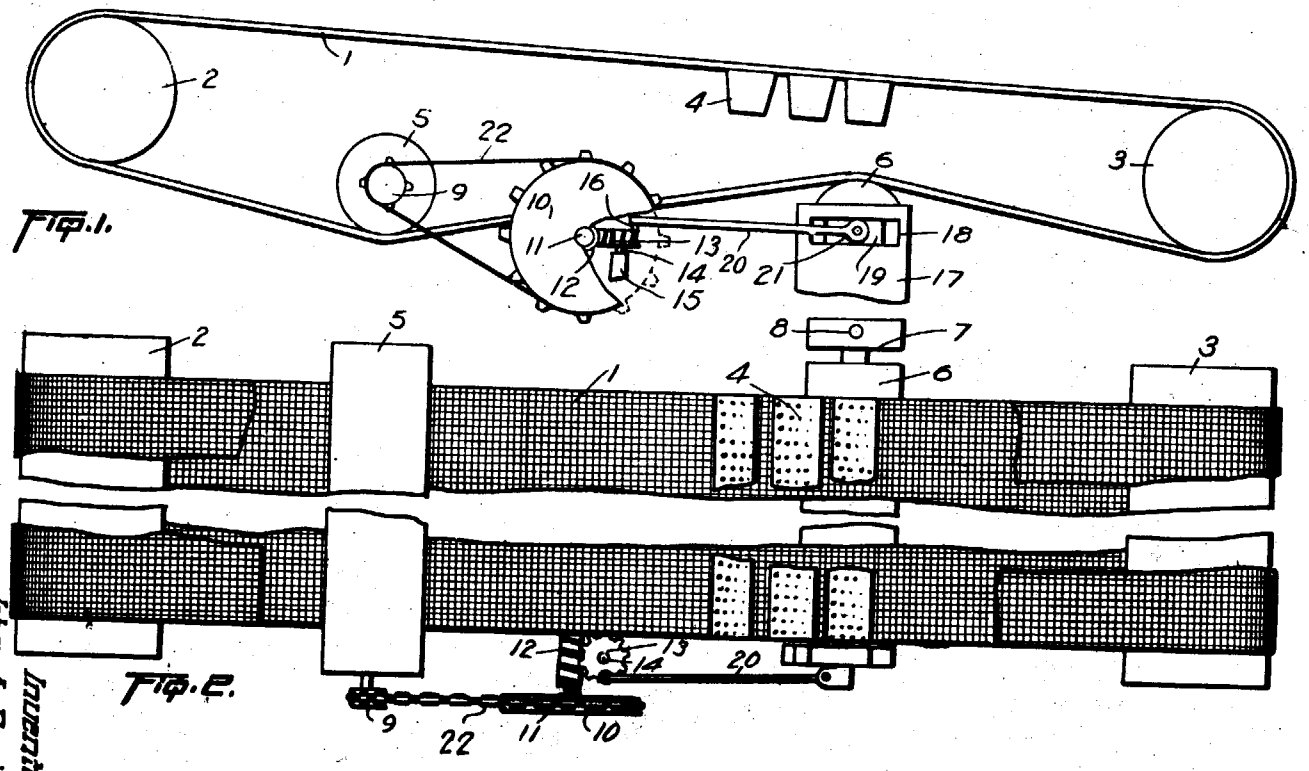
Inventor
John A. Devine
by Fitzgerald, Brooks & Co.
Attys.

Reissued Feb. 21, 1928. Re. 16,883

UNITED STATES PATENT OFFICE.

JOHN ALEXANDER DEVINE, OF THOROLD, ONTARIO, CANADA.

PAPER-MAKING MACHINE.

Original No. 1,582,583, dated April 27, 1926, Serial No. 37,309, filed June 15, 1925. Application for reissue filed December 20, 1926. Serial No. 156,057.

My invention relates to improvements in paper making machines, and the object of the invention is to devise simple and cheaply constructed means for preventing wire mesh carrying the paper stock cutting into the wooden tops of the suction boxes longitudinally and it consists essentially of the arrangement and construction of parts as hereinafter more particularly explained.

Fig. 1 is a side elevation showing the wire mesh, its carrying rollers, suction boxes and my device;

Fig. 2 is a plan view of the parts shown in Fig. 1.

In the drawings like characters of reference indicate corresponding parts in each figure.

1 indicates a wire mesh in the form of an endless band upon which the paper stock is distributed in the usual manner.

2 is a brest roll and 3 is a couch roll.

4 are the suction boxes by which the superfluous moisture is drawn off from the paper pulp as it passes thereover.

5 is an idler roller driven by the wire mesh. The brest and couch rollers 2 and 3 and idler roller 5 are mounted according to the usual practice in bearings, which bearings I have not shown as they form no part of my invention.

6 is a roller over which the lower run of the wire mesh passes. The shaft 7 of the roller 6 is pivotally mounted at one end as indicated at 8 to permit the roller to swing in a horizontal plane.

9 is a sprocket gear secured to the shaft of the idler roller 5.

10 is a sprocket gear mounted upon a shaft 11 carried in suitable bearings (not shown) and upon which is secured a worm 12.

13 is a worm gear turnably mounted upon a stud 14 carried by a standard 15. The worm gear 13 is provided with a crank pin 16.

17 is a standard provided with a slideway 18 in which is slidably carried a bearing 19 in which is journalled the opposite end of the shaft 7.

20 is a link provided with an eye 21 at one end carried upon the projecting end of the shaft 7 and connected at its opposite end to the crank pin 16.

It will be seen by this construction that the idler roller 5 being driven by the travel of the wire mesh 1, the worm 12 is revolved through the sprocket drive consisting of the sprocket gears 9 and 10 and sprocket chain 22, thereby driving the worm gear 13 carrying the free end of the shaft 7 alternately in opposite directions by means of the connecting link 20 thereby swinging the roller 6, slowly, which swinging movement of the roller guides the wire mesh 1 alternately laterally in opposite directions so that its line of travel longitudinally is alternately altered, so that it moves over the suction boxes in constantly changing positions so as to wear the surface of the suction box evenly, preventing any grooving or cutting into the suction boxes by the wire travelling thereover, constantly in the same position.

It will be understood that under ordinary conditions the tendency is for the longitudinal strands of the wire mesh to cut fine transverse grooves in the wooden tops of the suction boxes when these strands travel in an unchanging position. When, however, they are moved laterally by my device, the effect is to eliminate any tendency to the formation of these transverse grooves as the lateral movement of the longitudinal strands on the suction boxes wears away any wood which is tended to be left on each side of such grooves, thereby maintaining the surface of the suction box in a smooth even condition.

Although I have described a sprocket drive whereby my device is operated, it will of course be understood that any other driving connection may be employed for achieving the same result.

What I claim as my invention is:

1. In a paper making machine, the combination with stationary suction boxes and an endless wire mesh, the upper ply of which travels over said boxes, of means driven by the lower ply to impart a continuous slow angular swinging movement to said lower ply, whereby said upper ply is caused to reciprocate laterally in its longitudinal travel over said boxes.

2. In a paper making machine, the combination with stationary suction boxes and an endless wire mesh, the upper ply of which travels over said boxes, of a horizontally oscillatory guide roller for the lower ply, a worm gear driven by the latter, a crank pin on said gear, and a crank actuated by said pin for oscillating said roller.

3. In a paper making machine, the combination with stationary suction boxes and an endless wire mesh, the upper ply of which travels over said boxes, of a horizontally oscillatory guide roller for the lower ply, a sprocket wheel driven by the latter, a worm on the shaft of said wheel, a horizontal worm gear driven by said worm and having a crank pin, and a crank actuated by said pin for oscillating said roller.

4. A Fourdrinier machine having a device operated by the wire and means whereby said device by its operation continually shifts the wire from side to side.

5. A Fourdrinier machine having a device rotated by the wire and means whereby said device by its rotation continually shifts the wire from side to side.

6. A Fourdrinier machine having a wire roll mounted to effect a lateral shifting of the wire and means operated by the wire for effecting such shifting movement so as to continually shift the wire from side to side.

7. A Fourdrinier machine having a wire roll mounted for swinging movement to cause the lateral shifting movement of the wire and means operated by the longitudinal movement of the wire for continually swinging the same so as to shift the wire continually from side to side.

8. A Fourdrinier machine having a wire roll mounted for swinging movement to effect the lateral shifting movement of the wire and means for continually effecting such swinging movement so as to shift the wire continually from side to side.

9. A Fourdrinier machine having a wire roll mounted for swinging movement to effect the side to side shifting movement of the wire and means operated by the wire for continually effecting such swinging movement of said roll so as to continually shift the wire from side to side, said means comprising a worm and wheel arrangement and means for moving one end of the roll controlled by said worm and wheel arrangement.

10. A Fourdrinier machine having a wire roll mounted for lateral swinging movement to effect the lateral shifting movement of the wire, a sliding bearing for said roll, a worm, a worm wheel cooperating with said worm, a crank rotatable with said worm wheel and a link connected with said crank and also connected with said sliding bearing to effect the reciprocation of the latter.

11. A Fourdrinier machine having a wire roll mounted to permit swinging or vibratory movement to effect the lateral shifting of the wire and means for continually effecting such swinging or vibratory movement so as to continually shift the wire from side to side.

In testimony whereof I have hereunto affixed my signature.

JOHN ALEXANDER DEVINE.